3,050,939
GAS TURBINE ENGINE WITH SHAFT FAILURE CONTROL

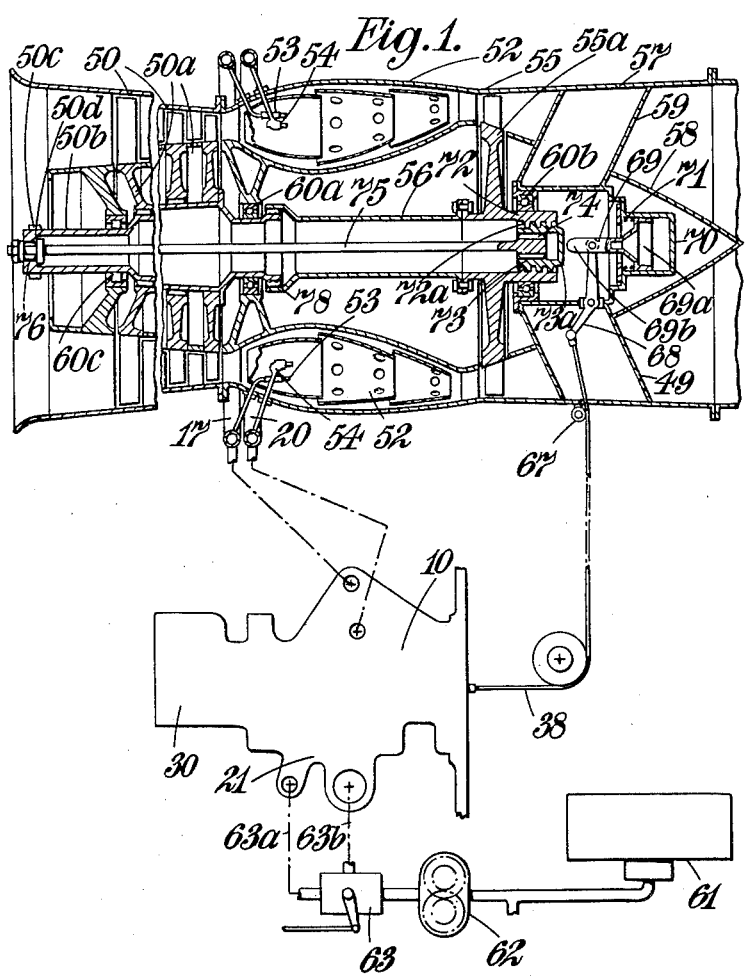

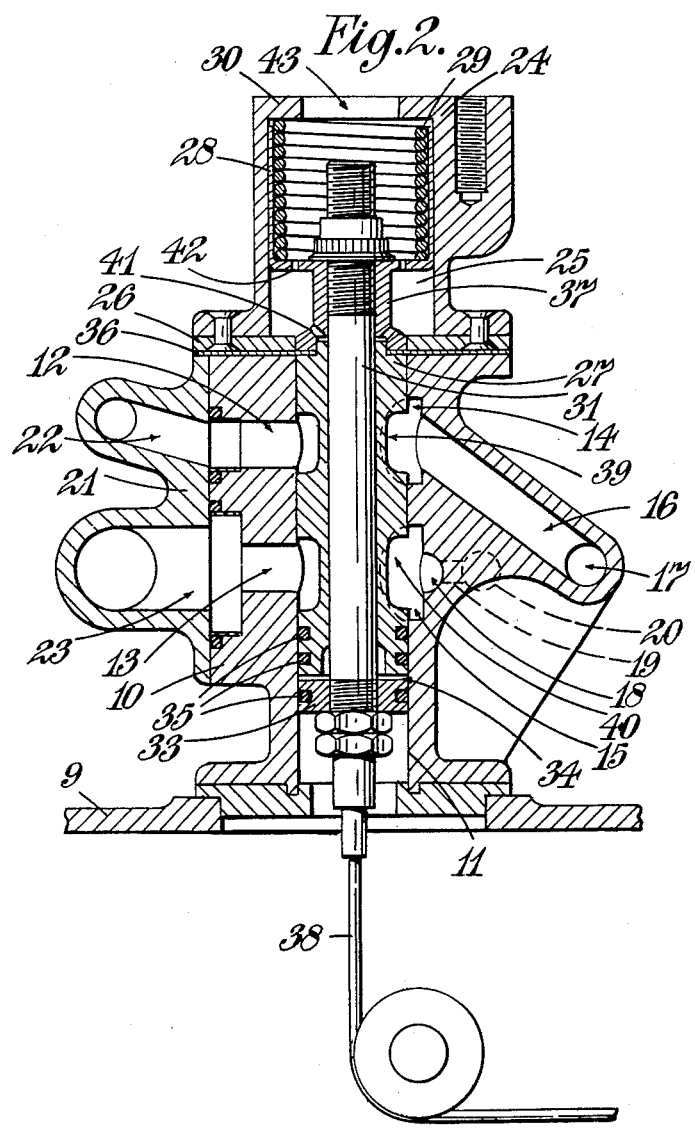

Frederick William Walton Morley, Castle Donington, England, assignor to Rolls-Royce Limited, Derby, England, a British company
Filed May 5, 1960, Ser. No. 27,101
3 Claims. (Cl. 60—39.09)

This invention comprises improvements in or relating to gas-turbine engines of the kind which comprises a turbine rotor and a coaxial driven member, for example a compressor rotor, or a reduction gear of a propeller, or both, the turbine and driven member being interconnected by a driving shaft. Such a gas-turbine will be termed "a gas-turbine of the kind referred to." The invention is more particularly, though not exclusively, applicable to single shaft and "two-shaft" propeller-driving gas-turbine engines. A "two-shaft" engine has a low-pressure compressor and a high-pressure compressor connected in series flow to supply air to combustion equipment, the combustion products from which are passed to a high-pressure turbine and a low-pressure turbine connected in series flow, the low-pressure turbine driving the low-pressure compressor through a first shaft and the high pressure turbine driving the high-pressure compressor through a second shaft; in such an engine the propeller is usually driven by the low-pressure turbine.

It will be appreciated that, in the event of failure of the shaft driving the propeller or, in the case of a two-shaft engine, the shaft driving one of the compressors and propeller, the turbine will accelerate rapidly due to the removal of the load it is driving and that, unless such acceleration is prevented, over-speeding and serious damage such as bursting of the turbine rotor, may occur.

According to the present invention, there is provided for a gas turbine engine of the kind referred to, control means which responds rapidly to shaft failure to prevent over-speeding, the control means comprising a pair of mechanically-connected parts respectively mechanically connected to the rotor assembly at opposite ends of the ends of the driving shaft, the mechanical connection between the parts and the mechanical connections between the parts and the rotor assembly being such that, on failure of the shaft and consequent relative rotation of the turbine and driven member, one of the parts is moved relative to the adjacent end of the shaft, and the said one part is connected to cause by said movement a reduction in the fuel supply to the engine, and the control means being characterised in that the fuel supply means includes a valve having a frangible diaphragm interconnecting fixed and movable elements of the valve so as to hold the valve in an open position, and a spring for urging the movable valve element towards a closed setting, the diaphragm being fractured as a result of a load applied to the movable valve element on movement of the one part of the control means relative to the shaft on shaft failure.

The load is preferably applied to the movable valve element by a plunger and cable mechanism which is operated by abutment of said one part on the plunger on movement of the one part due to failure of the shaft.

One form of such fuel control valve is illustrated by way of example in the accompanying drawings in which:
FIGURE 1 illustrates a gas turbine engine and its shaft failure control, and
FIGURE 2 is a section through the fuel shut-off valve.

In a gas-turbine engine it is usual to provide main and pilot fuel manifolds encircling the engine, and in FIGURE 2 the valve shown is adapted to be mounted on the engine casing 9 adjacent these manifolds.

In FIGURE 1 of the drawings, the engine shown comprises a compressor 50 having a rotor structure 50a the forward end of which has a stub shaft 50b carrying a sun gear 50c of a planetary reduction gear through which a propeller (not shown) is driven, combustion equipment 52 receiving compressed air from the compressor 50, and fuel from pilot injectors 53 and main injectors 54, a turbine 55 having a rotor 55a driving the rotor 50a through hollow shaft 56, and an exhaust assembly including outer wall 57, central cone 58 and hollow struts 59 supporting the cone 58 from the wall 57. The rotor assembly 50a, 55a, 56 is supported in bearings 60a, 60b, 60c.

Fuel is supplied to injectors 53, 54 from fuel tank 61, the fuel being drawn from the tank 61 by pump 62 and being delivered by the pump through a fuel control mechanism 63 having a pair of outlet pipes 63a, 63b leading respectively to a pilot fuel manifold 17 and main fuel manifold 20 from which the injectors 53, 54 are fed.

The outlet pipes pass through a shut-off valve (FIGURE 2) which is operated on failure of shaft 56 to cut off the supply of fuel to the injectors 53, 54.

The valve (FIGURE 2) has a body 10 provided with a central bore 11 with which a pair of inlet ports 12, 13 communicate. The bore 11 has opposite the ports 12, 13 a pair of local recesses 14, 15 of which recess 14 communicates with a passage 16 leading to the pilot fuel manifold 17, and of which recess 15 leads to a hemispherical chamber 18 which is connected by a passage 19 to the main fuel manifold 20. In practice the manifolds 17, 20 pass through the valve body 10.

A connector piece 21 is mounted on the body and it has a passage 22 leading from the pilot fuel supply pipe 63a to the port 12 and a passage 23 leading from the main fuel supply pipe 63b to port 13.

The body 10 has secured to it a spring housing unit comprising a cylinder 24 having a bore 25 of larger diameter than the bore 11 and an end plate 26 having a central aperture registering with the adjacent end of the bore 11.

The bores 11, 25 accommodate a movable valve element which comprises a central bolt 31 carrying a sleeve 27 slidable in bore 11 and a cup member 28 which is slidable in the bore 25 and houses a compressed spring 29. One end of the spring 29 bears on the cup member 28 and the opposite end bears against a flange 30 at the end of the cylinder 24 remote from the plate 26. The bolt 31 has threaded on it a washer 33 which has a slight axial clearance 34 from the end of the sleeve 27 remote from the spring housing unit, and this end of the sleeve and the washer carry sealing rings 35.

The sleeve 27 has a pair of circumferential grooves 39, 40 connecting the port 12 with the recess 14 and the port 13 with the recess 15 so that, when the valve element is in the normal position as shown, pilot fuel flows from port 12 around groove 39 to recess 14 and thus to the pilot fuel manifold 17, and main fuel flows from port 13 around groove 40 to recess 15 and thus to the main fuel manifold 20.

The movable valve element is urged downwardly (as viewed in FIGURE 2 of the drawings) by the spring 29, but the movable valve element normally is held in the position shown against the load of the spring 29 by an annular diaphragm 36, the outer peripheral portion of which is gripped between the end plate 26 of the spring housing unit and the valve body 10 and the inner peripheral portion of which is gripped between an extension 37 of the cup member 28 and the adjacent end of the sleeve 27. The lower end of the bolt 31 has one end of a cable 38 secured to it.

The cable 38 is arranged to be jerked to rupture the diaphragm 36 in the event of failure of the shaft 56 of the engine.

The annular diaphragm 36 may be aluminum and has its shear strength selected so that the diaphragm is capable of withstanding loads applied to it by the spring 29 and any springs such as spring 71, provided to keep cable 38 taut, and so that it is sheared when the cable 38 is jerked in operation of the safety device thereby to release the movable valve element to be moved to the fuel cut-off position by the spring 29.

The cable 38 runs over pulleys 67 to one arm of a bell-crank 68 housed in the cone 58 and the other arm of the bell-crank 68 is connected to a plunger 69. The plunger 69 has an enlargement 69a at one end received in a housing 70 containing a compression spring 71 which urges the plunger 69 to the right, and a nose 69b projecting towards the end of shaft 56. The spring 71 serves to keep the cable 38 taut and also to prevent inadvertent contact of the plunger 69 with rotating parts of the engine.

The turbine rotor 55a has a stub shaft 72 projecting through bearing 60b into the cone 58 and the stub shaft has an internal screwthread 72a engaged by an externally-threaded sleeve 73. The sleeve 73 has a splined connection 74 with one end of a rod 75, the opposite end of which has a splined connection 76 with and is secured to a flange 50d internally of the stub shaft 50b adjacent the sun gear 50c. The sleeve 73 has a projection 73a axially-aligned with but slightly spaced from the nose 69b of the plunger 69.

In the event that the shaft 56 breaks in operation, the sleeve 73, due to its connection to rotor 50a through splines 74, rod 75, splines 76 and stub shaft 50b, continues to rotate at the speed of the rotor 50a, and the stub shaft 72, due to being connected to the turbine rotor 55a which speeds up, rotates relatively to the sleeve 73 so displacing it rapidly in the axial direction. The hand of the thread 72a is chosen so that on such relative rotation, the sleeve 73 is moved to the right bringing projection 73a into contact with nose 69b of plunger 69 and moving the plunger 69 to the right. This movement of the plunger 69 rocks bell-crank 68 and through the cable 38 jerks the valve member 27, 31.

The sudden load thus applied to the valve element causes the diaphragm 36 to rupture so permitting the valve element to move to a position in which the grooves 39, 40 are clear of the ports 12, 13 and the flow of fuel to the manifolds 17, 20 is cut off. This movement of the valve element is assisted by the spring 29 which also serves to hold the valve element in the "failed" position. Thus the fuel supply to the engine is rapidly cut off whereby serious damage to the engine due to over-speeding of the turbine is avoided.

A similar shut off of fuel is obtained if bearing 60b should fail. In this case the gas loads on the turbine rotor 55a move it to the right causing operation of the fuel shut off valve. The right hand movement of the rotor 55a is permitted by the spline connection 78 between shaft 46 and the compressor rotor 40a.

Any fuel leaking along the sleeve 27 towards the washer 33 collects in the clearance space 34 and then flows in a clearance between the bolt 31 and the sleeve 27 and through holes 41 into bore 25, and then through holes 42 into the cup member 28. The fuel so collecting can flow to an overboard drain through aperture 43.

I claim:

1. In a gas turbine engine including a rotor assembly comprising a shaft and a turbine rotor at one end of the shaft and further including control means which responds to failure of the shaft to prevent over-speeding of the turbine rotor, said control means comprising a pair of mechanically-connected parts respectively mechanically connected to the rotor assembly at opposite ends of the driving shaft, the mechanical connections between the parts and the rotor assembly permitting one of the parts to move relative to the adjacent end of the shaft on failure of the shaft and consequent relative rotation of the turbine rotor and a portion of the shaft remote from the turbine rotor, a fuel system including a cut-off valve, the said one of the parts being mechanically connected to cause by said movement closure of the valve; a construction of said valve comprising a fixed valve element, a movable valve element, a frangible annular diaphragm interconnecting the fixed and movable elements of the valve and holding the valve in an open position, the diaphragm being fractured as a result of a load applied to the movable valve element in the sense of closing the valve on movement of the one part of the control means relative to the shaft on shaft failure, and a spring also loading the movable valve element in the sense of closing the valve thereby to ensure rapid closure of the valve on shaft failure, the fixed element of the valve comprising a valve body and a separate housing for the spring secured together and gripping between them the outer peripheral portion of the diaphragm, the valve body and spring housing having aligned bores, the movable element of the valve sliding in the bore in the valve body, an abutment member formed as a separate piece from the movable valve element and sliding in the bore in the spring housing, the spring bearing on the abutment member, the abutment member being secured to one end of the movable valve element, the abutment member and the movable valve element gripping the inner peripheral portion of the annular diaphragm between them, and the said one part of the control means being connected to the opposite end of the movable element and applying a load on shaft failure causing sliding of the movable element in a direction away from the spring housing.

2. In a gas turbine engine, a valve construction according to claim 1, the spring being a compression spring and the abutment member being cup shaped and receiving the spring in a compressed condition, the spring housing having an abutment for the other end of the spring.

3. In a gas turbine engine, a valve construction according to claim 1, the diaphragm being aluminium and having a selected shear strength.

References Cited in the file of this patent

UNITED STATES PATENTS

| 1,924,868 | Lovekin | Aug. 28, 1933 |
| 2,048,388 | Johnsen | July 21, 1936 |
| 2,070,661 | Hughes | Feb. 16, 1937 |
| 2,163,401 | Loudenbeck | June 20, 1939 |
| 2,745,627 | Winfree | May 15, 1956 |
| 2,930,189 | Petrie | Mar. 29, 1960 |